3,000,762
PROCESS FOR REACTING POLYMERIC MATERIALS WITH SULFONES AND PRODUCTS RESULTING THEREFROM
Giuliana C. Tesoro, Dobbs Ferry, N.Y., assignor to J. P. Stevens & Co., Inc., New York, N.Y., a corporation of Delaware
No Drawing. Filed Aug. 25, 1960, Ser. No. 51,778
14 Claims. (Cl. 117—139.5)

The present invention relates to novel chemical processes for modifying the solubility properties of polymeric materials, and more specifically for increasing the water resistance of non-cellulosic water sensitive polymers containing a plurality of hydroxyl groups per polymeric molecule such as starch, polyvinyl alcohol, partially saponified polyvinyl esters and the like.

This invention also relates to the insolubilized products resulting from the above modification.

Moreover, this invention also relates to a process for producing said insolubilized products in situ on fabrics and to the products resulting therefrom.

It is known to react water soluble polymers with unsaturated sulfones such as divinyl sulfone in order to increase their water resistance. Such a process is taught for example in U.S. Patent 2,524,400 for the chemical modification of starch.

While the aforementioned process yields useful products, the employment of vinyl compounds, and particularly or divinyl sulfone as a reagent presents certain extreme hazards and disadvantages. For examples, divinyl sulfone is as extremely toxic chemical whether taken orally or by absorption through the skin. It causes severe burns when in contact with the skin. It is a powerful lachrymator and vesicant. It is a liquid of relatively high vapor pressure, and therefore difficult to handle (as, for example in weighing). At alkaline pH (above 9.0), it reacts readily with water, so that alkaline solutions of divinyl sulfone have very limited stability.

By contrast, the sulfones of our invention have oral toxicity 20 to 100 times lower than that of divinyl sulfone. They do not act as lachrymators or vesicants, and do not cause burns when in contact with the skin. They are solids, or liquids of extremely low vapor pressure, and can easily be handled in laboratory or mill operations. They exhibit excellent stability in aqueous solutions.

Accordingly it would be highly desirable for many industrial applications to provide a process utilizing a sulfone that is free of the objectionable properties noted for divinyl sulfone and which will react with the aforementioned water sensitive polymers to yield products possessing greatly improved water resistance in comparison with the unmodified polymers.

It is, therefore, an object of this invention to provide a novel process whereby water sensitive polymers containing a plurality of hydroxyl groups per polymeric molecule are rendered water resistant by being reacted with sulfones which are free of the limitations possessed by divinyl sulfone.

A further object of this invention is to provide new and useful polymeric materials which are prepared by reacting certain polymeric materials containing a plurality of hydroxyl groups per polymeric molecule with selected sulfones.

A further object of this invention is to provide a novel process for imparting a durable size to a fabric.

A further object of this invention is to provide a novel sized fabric as a result of the aforementioned process for imparting a durable size to a fabric.

These and other objects will become apparent from the description which follows:

In accordance with the present invention, a water soluble polymer containing hydroxyl groups is rendered insoluble by reacting it in the presence of an alkaline catalyst with a sulfone represented by the general formula (1) 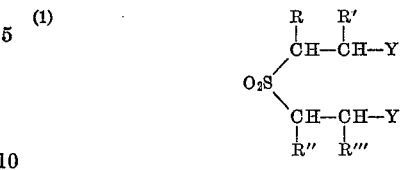

where R, R', R", and R'" are selected from the group consisting of hydrogen and methyl, and Y represents a polar residue derived from a reagent of weak neucleophilic character such as the cation of a weak base (e.g. —$NC_5H_5$, pyridinium) the anion of a strong acid (e.g. —$SSO_3Na$, thiosulfate; —$OSO_3Na$, sulfate), and the like. Nucleophilic character is defined as the tendency to donate electrons or share them with a foreign atomic nucleus (Gilman—Organic Chemistry, second edition, vol. II, p. 1859).

The polymers suitable for the process of the present invention may be natural (e.g. starch) or synthetic (e.g. polyvinyl alcohol, partially saponified polyvinyl acetate and the like). In the case of synthetic polymers, they may be used in the form of bulk resin, film, fiber, yarn or fabric. Among the starches which may be used are the cereal starches such as corn starch, rice starch, wheat starch and the like; the root starches such as potato starch, tapioca starch and the like, as well as the starches derived from stems, fruits and seeds. Both the amylose (soluble in cold water) and the amylopectin (insoluble in cold water) fractions of raw starch are operative, and the partial degradation products of starch (generally termed dextrins) are also operative. The latter are polymeric products obtained from starch by heating, by partial acid or base hydrolysis, or by enzymatic hydrolysis. Chemically modified starches where part (not more than about 50%) of the hydroxyl groups have been acetylated, etherified or otherwise substituted are also operative. Among the polyvinyl alcohol derivatives which may be used are the polyvinyl alcohol resins derived by partial or total hydrolysis of polyvinyl acetate (marketed for example under the trade name of "Gelvatol" by the Shawinigan Resin Corp., under the trade name of "Elvanol" by E. I. du Pont de Nemours, and the like), polyvinyl alcohol fibers and yarns (marketed for example under the trade name of "Vinal" by the Air Reduction Chemical Co.) either unmodified (100% of the hydroxyl groups are free and unsubstituted) or where part of the hydroxyl groups (not more than about 50%) have been reacted to form acetals, esters, ethers or other substituted products. Saponified copolymers of organic vinyl esters with other monomers (for example vinyl chloride, acrylate esters, acrylonitrile, styrene and the like) may also be used.

The preferred sulfones of the present invention, the methods of preparing them, and the use of said sulfones to treat cellulosic polymers or materials are described in a copending application, Serial No. 826,133, filed July 10, 1959. These sulfones, which correspond in general to formula (1) above, are further characterized by the following structural formula:

(2) 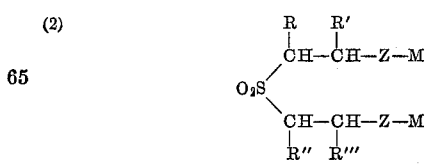

where R, R', R" and R'" have the same meaning as in Formula 1 above, Z is selected from the group consisting of —$OSO_3$— and —$SSO_3$—, and M is an alkali metal selected from the group consisting of sodium, potassium, lithium, and the like. It will be evident that in Formula 2, —Z—M corresponds to —Y of Formula 1.

Other sulfones contemplated by Formula 1 include those corresponding to the following structure:

(3) 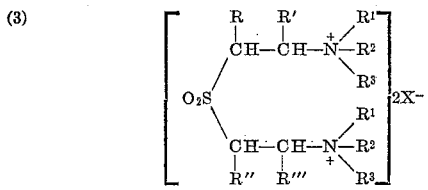

wherein R, R', R" and R''' have the same meaning as in Formula 1; $R^1$, $R^2$, and $R^3$ are substituents such as alkyl, aryl, and alkaryl groups of a tertiary amine having an ionization constant lower than about $10^{-5}$; and X is a negatively charged ion derived from an inorganic acid such as hydrochloric, sulfuric, nitric, and the like or from an organically substituted inorganic acid such as methanesulfonic, benzenesulfonic, and the like. It is to be understood that hydrochloric acid is given by way of example only since halogen acids in general can be employed.

Further, sulfones encompassed by Formula 1 include those corresponding to the following structure:

(4) 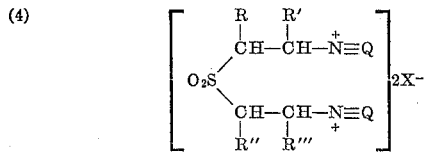

wherein R, R', R", R''', and X have the same meaning as in Formula 3 above and Q is part of a heterocyclic ring of which the nitrogen atom in the formula is also a part such as in pyridine, isoquinoline, alkyl pyrrolidine, and the like.

The amount of sulfone which is required to produce the desired effect in the process of the present invention varies widely, depending on the structures of the polymer and sulfone which are reacted, and on the extent of modification which is desired. The amount of sulfone employed may be as low as 3% and as high as 200%, based on the weight of the polymer.

The alkaline catalyst is generally a strong base. The phosphates, carbonates, hydroxides and alkoxides of alkali metals, and the quaternary ammonium hydroxides are preferred catalysts. The amount of catalyst employed may be varied between wide limits, and depends on the specific base which is selected, on the time and temperature of reaction, and on the nature of the polymer. When sodium hydroxide is used for example, the concentration may be varied between 0.1% and 30%, based on the weight of solution, with the reaction time varying from several hours to a few seconds at room temperature as the concentration of sodium hydroxide is increased.

The inert solvent or dispersion medium used for carrying out of the reaction between the sulfone compound and the polymer can be water or a non-reactive organic compound plus mixtures thereof.

The reaction can be carried out at temperatures ranging from 0° C. to 100° C., and ambient temperatures of 20° C. to 30° C. are preferred.

The reaction can take place at sub-atmospheric, atmospheric or super-atmospheric pressure, but preferably atmospheric pressure is employed.

The reaction can be carried out on the polymer itself, as in the case of polyvinyl alcohol fiber, yarn, fabric and the like. It can be carried out also on an aqueous solution or suspension of the polymer. On the other hand, it can be carried out upon yarn or fabric which has been sized with a polyvinyl alcohol or starch derivative. In the latter case, the sizing material is insolubilized in situ, and the effect of the sizing compound is rendered durable to washing.

The following examples are given to illustrate our invention.

*Example 1*

Forty-four grams of a 10% aqueous solution of a partially saponified polyvinyl acetate (containing about 40% residual acetate—product marketed as Gelvatol 40–10 by the Shawinigan Resin Corp.) are mixed with 32 grams of a 25% solution of the sulfone compound

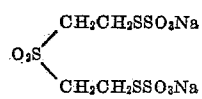

A clear solution results. Upon adding 17.6 grams of a 25% aqueous solution of sodium hydroxide, an insoluble polymer immediately precipitates. This is washed with dilute acetic acid, then with water and dried. The polymer is insoluble in boiling water.

*Example 2*

The procedure of Example 1 is repeated using 8.8 grams of a 25% sodium hydroxide solution. The polymer obtained is identical with that of Example 1 and is insoluble in boiling water.

*Example 3*

Forty-four grams of a 10% aqueous solution of a partially saponified polyvinyl acetate (containing about 40% residual acetate—Gelvatol 40–10) are mixed with 0.32 gram of a 25% solution of the sulfone used in Example 1 and 1.75 grams of a 25% aqueous sodium hydroxide solution are added. After 5 minutes at room temperature, an insoluble polymer precipitates out which is collected on a filter, washed and dried. This product also is insoluble in boiling water.

*Example 4*

Sixty-two grams of a 7% solution of polyvinyl alcohol (obtained by total hydrolysis of polyvinyl acetate—product marketed as Gelvatol 1–60 by the Shawinigan Resin Corp.) are mixed with 0.3 gram of a 25% solution of the sulfone used in Example 1. Upon adding 0.2 gram of a 25% solution of sodium hydroxide an insoluble polymer precipitates which is filtered, washed and dried. This product is insoluble in boiling water.

*Example 5*

Forty-four grams of a 10% aqueous solution of partially saponified polyvinyl acetate (Gelvatol 40–10) are mixed with 18.4 grams of the sulfone compound

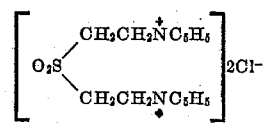

at room temperature. A clear solution is obtained. When 32 grams of 25% NaOH are added to this solution, an insoluble gel precipitates out. After filtering, washing and drying this gel is tested for water resistance. A one gram sample of the gel is treated with 25 cc. of boiling water for 5 minutes, filtered, dried and weighed. No weight loss is observed, proving the excellent water resistance of the product prepared.

*Example 6*

The procedure of Example 5 is repeated, except that the partially saponified polyvinyl acetate (Gelvatol 40–10) is replaced with completely hydrolyzed polyvinyl acetate (Gelvatol 1–60). Results similar to those observed with Example 5 are obtained.

*Example 7*

One hundred-fifty grams of corn starch (Pearl Corn Starch—Clinton Industries, Inc.) are stirred with a solution containing 200 grams of water, 10 grams of a 25% solution of the sulfone of Example 1 until a homogeneous slurry is formed. This slurry is then treated with 100 grams of 3% sodium hydroxide solution, and the mixture is allowed to stand at room temperature. At the end of 1 hour, the solid is filtered, washed with dilute acetic acid and water.

A test portion of the solid product (1 gram) is suspended in 10 grams of water and the water is brought to a boil. The modified starch product swells slightly, while the untreated starch forms a thick gelatinous mass when tested by the same procedure.

*Example 8*

The procedure of Example 7 is repeated using 47 grams of a 25% solution of the sulfone of Example 1. By so increasing the amount of sulfone reactant, the modified corn starch which is obtained can be boiled with water without rupture of the individual starch particles and without increase in the viscosity of the aqueous solution.

*Example 9*

The procedure of Examples 7 and 8 is repeated, replacing the 150 grams of corn starch with 75 grams of a cold water soluble starch marketed under the trade name "Kosol" by the National Starch and Chemical Co. This starch which is completely soluble in cold water is rendered insoluble in water even at the boil after reaction with the sulfone of Example 1.

*Example 10*

When the procedure of Example 7 is repeated using 10 grams of the sulfone of Example 5, the properties of the product obtained are identical to those of the product of Example 7. By increasing the amount of sulfone to 45 grams, the insolubilization of the starch is as complete as that observed in Example 8. It is thus apparent that the degree of swelling of starch particles in water can be varied almost at will by varying the concentration of sulfone reagent used in the treatment.

*Example 11*

Samples of yarn manufactured from unmodified polyvinyl alcohol fiber (non-heat treated, yarn size 25/1) are impregnated with an aqueous solution containing 250 grams per liter of the sulfone compound

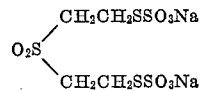

The yarn is passed through the squeeze rolls of a laboratory padder, adjusting the pressure of the rolls so as to give a wet pickup of about 75%. The uptake of sulfone is thus about 18 grams per 100 grams of yarn. The yarn so treated is dried, then passed through a 10% potassium hydroxide solution, squeezed through the rolls of the padder and allowed to stand at room temperature for 30 minutes. It is then washed in dilute acetic acid and water, and dried. The yarn so treated is insoluble in boiling water, while the untreated yarn is gradually dissolved when immersed in water at 70°–80° C.

*Example 12*

Samples of cotton fabric are treated with solutions of the following compositions, passed through the rolls of a laboratory padder set to give about 70% wet pickup, and dried:

| Sample | Solution |
| --- | --- |
| a | 7.7% Kosol starch (cold water sol. starch—a product of the National Starch and Chemical Co.). |
| b | 7.7% Kosol starch+1.5% Sulfone of Example 5. |
| c | 7.7% Kosol starch+4.6% Sulfone of Example 5. |
| d | 7.7% Kosol starch+4.6% of a 25% solution of the sulfone of Example 1. |
| e | 7.7% Kosol starch+9.2% of a 25% solution of the Sulfone of Example 1. |
| f | 6.2% polyvinyl alcohol resin (Gelvatol 1–90—a product of the Shawinigan Resin Corp.). |
| g | 6.2% polyvinyl alcohol (Gelvatol 1–90)+6.2% of a 25% solution of the sulfone of Example 1. |
| h | 6.2% polyvinyl alcohol (Gelvatol 1–90)+ 23.1% of the sulfone of Example 5. |

After drying, the samples are treated with a 10% solution of sodium hydroxide, passed through the squeeze rolls of a laboratory padder and allowed to stand at room temperature for 1 hour. After neutralizing, washing and drying, all samples exhibit varying degrees of body and stiffness. Samples (*a*) (treated with starch only) and (*f*) (treated with polyvinyl alcohol only) lose their stiffness after one machine laundering at 140° F., while the hand, feel and stiffness of all other samples remained essentially unchanged through 5 or more machine launderings at 140° F. These experiments demonstrate the insolubilization of starch and polyvinyl alcohol sizing materials in situ by the process of our invention.

Other fabrics besides cotton can be treated in this manner. For example, fabrics manufactured from regenerated cellulose, polyamide, polyester and acrylic fibers can be so treated if a stiff finish which is durable to laundering is desired.

While the illustrative embodiments of the invention have been described hereinbefore with particularity, it will be understood that various other modifications will be apparent to and can readily be made by those skilled in the art without departing from the scope and spirit of the invention. Accordingly, it is not intended that the scope of the claims appended hereto be limited to the examples and description set forth herein but rather that the claims be construed as encompassing all the features of patentable novelty which reside in the present invention including all features which would be treated as patentable equivalents thereof by those skilled in the art.

I claim:

1. A process for insolubilizing non-cellulosic natural and synthetic polymers containing a plurality of hydroxyl groups per polymeric molecule by reacting said polymers in the presence of an alkaline catalyst with a sulfone corresponding to the formula

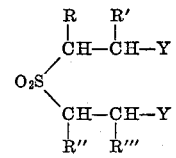

where R, R′, R″, and R‴ are selected from the group consisting of hydrogen and methyl and Y is a polar residue derived from a reagent of weak nucleophilic character.

2. The process of claim 1 in which the sulfone is selected from the group consisting of

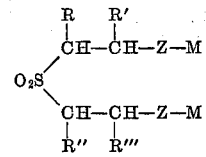

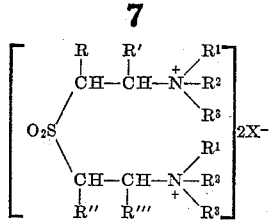

and

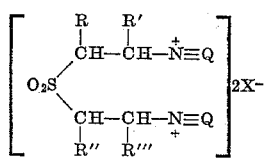

wherein R, R', R", and R'" have the same meaning as in claim 1; Z is a member selected from the group consisting —OSO₃— and —SSO₃—; M is an alkali metal; R¹, R², and R³ are members selected from the group consisting of alkyl, aryl, and alkaryl substituents of a tertiary amine having an ionization constant lower than about 10⁵; X is a negatively charged ion derived from an acid selected from the group consisting of halogen, sulfuric, nitric, methanesulfonic and benzenesulfonic acids; and Q is a part of a heterocyclic ring of which the nitrogen is also a part.

3. The process of claim 2 in which the sulfone is

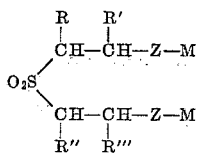

and R, R', R", R'", Z, and M have the same meaning as in claim 2.

4. The process of claim 2 in which the sulfone is

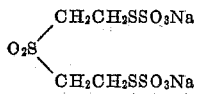

5. The process of claim 2 in which the sulfone is

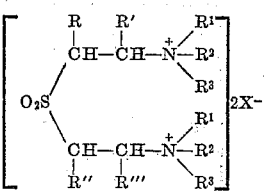

6. The process of claim 2 in which the sulfone is

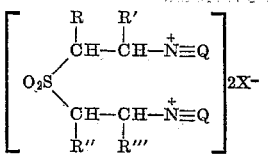

7. The process of claim 2 in which the reaction takes place in an inert solvent medium.

8. The process of claim 1 in which the polymer is selected from the group consisting of starches, dextrins, and polyvinyl alcohol derivatives.

9. The process of claim 8 in which the polymer is starch.

10. The process of claim 2 in which the concentration of the catalyst is between 0.1% and 30% based on the weight of the solution, the reaction temperature is between about 0° C. to 100° C., and the reaction takes place in an inert solvent medium.

11. In a method of imparting to a fabric a durable sizing material, the steps comprising impregnating said fabric with a non-cellulosic polymer containing a plurality of hydroxyl groups per polymeric molecule and thereafter insolubilizing said polymer on said fabric by reacting said polymer in the presence of an alkaline catalyst with a sulfone corresponding to the formula

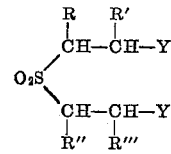

where R, R', R", and R'" are selected from the group consisting of hydrogen and methyl and Y is a polar residue derived from a reagent of weak nucleophilic character.

12. The insolubilized polymeric product of a non-cellulosic polymer containing a plurality of hydroxyl groups per polymeric molecule with a sulfone corresponding to the formula

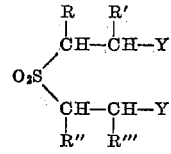

where R, R', R", and R'" are selected from the group consisting of hydrogen and methyl and Y is a polar residue derived from a reagent of weak nucleophilic character.

13. The insolubilized starch product of a starch with a sulfone corresponding to the formula

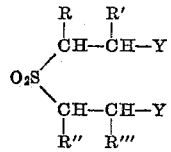

where R, R', R" and R'" are selected from the group consisting of hydrogen and methyl and Y is a polar residue derived from a reagent of weak nucleophilic character.

14. A fabric comprising the reaction product resulting from impregnating a fabric with a non-cellulosic polymer containing a plurality of hydroxyl groups per polymeric molecule and thereafter insolubilizing said polymer on said fabric with a sulfone corresponding to the formula

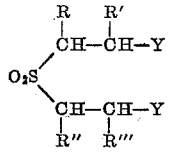

where R, R', R", and R'" are selected from the group consisting of hydrogen and methyl and Y is a polar residue derived from a reagent of weak nucleophilic character.

References Cited in the file of this patent

UNITED STATES PATENTS

| | | |
|---|---|---|
| 2,524,399 | Schoene et al. | Oct. 3, 1950 |
| 2,524,400 | Schoene et al. | Oct. 3, 1950 |
| 2,539,704 | Schoene et al. | Jan. 30, 1951 |